(12) United States Patent
Kornegay et al.

(10) Patent No.: US 11,234,416 B2
(45) Date of Patent: Feb. 1, 2022

(54) LIGHTED PET HARNESSING DEVICE

(71) Applicants: Albert Kornegay, Belleville, IL (US);
Aislinn Kornegay, Belleville, IL (US)

(72) Inventors: Albert Kornegay, Belleville, IL (US);
Aislinn Kornegay, Belleville, IL (US)

( * ) Notice: Subject to any disclaimer, the term of this patent is extended or adjusted under 35 U.S.C. 154(b) by 210 days.

(21) Appl. No.: 16/668,142

(22) Filed: Oct. 30, 2019

(65) Prior Publication Data
US 2021/0127638 A1    May 6, 2021

(51) Int. Cl.
*A01K 27/00* (2006.01)

(52) U.S. Cl.
CPC .......... *A01K 27/002* (2013.01); *A01K 27/006* (2013.01)

(58) Field of Classification Search
CPC ..... A01K 27/002; A01K 27/006; A01K 27/00
See application file for complete search history.

(56) References Cited

U.S. PATENT DOCUMENTS

| 743,578 | A | * | 11/1903 | Shrodes | A01K 27/006 |
| | | | | | 362/103 |
| 6,805,460 | B1 | | 10/2004 | Zoller | |
| 8,230,823 | B2 | | 7/2012 | Simoni | |
| 9,038,574 | B1 | * | 5/2015 | Brewton | A01K 27/002 |
| | | | | | 119/858 |
| 2007/0086182 | A1 | | 4/2007 | Kelly | |
| 2007/0107672 | A1 | | 5/2007 | Von Czenkow | |
| 2007/0256646 | A1 | | 11/2007 | Ayscue | |
| 2013/0128556 | A1 | | 5/2013 | Brauser | |
| 2014/0202397 | A1 | * | 7/2014 | Bentley | A01K 27/002 |
| | | | | | 119/863 |
| 2015/0313182 | A1 | * | 11/2015 | Overman | F21L 4/02 |
| | | | | | 119/850 |
| 2017/0219191 | A1 | * | 8/2017 | Fitzgerald | A01K 27/006 |

FOREIGN PATENT DOCUMENTS

WO   WO-2004112605 A1 * 12/2004   ........... A22B 5/0064

* cited by examiner

*Primary Examiner* — Kristen C Hayes

(57) ABSTRACT

A lighted pet harnessing device for illuminating an area in front of a pet includes a harness that is configured to couple to a pet and a leash. A lighting module that is coupled to a front of the harness is configured to illuminate an area in front of the pet when the harness is coupled to the pet.

19 Claims, 5 Drawing Sheets

LIGHTED PET HARNESSING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to harnessing devices and more particularly pertains to a new harnessing device for illuminating an area in front of a pet.

(2) Description of Related Art Including Information Disclosed Under 37 CFR 1.97 and 1.98

The prior art relates to harnessing devices.

BRIEF SUMMARY OF THE INVENTION

An embodiment of the disclosure meets the needs presented above by generally comprising a harness that is configured to couple to a pet and a leash. A lighting module that is coupled to a front of the harness is configured to illuminate an area in front of the pet when the harness is coupled to the pet.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
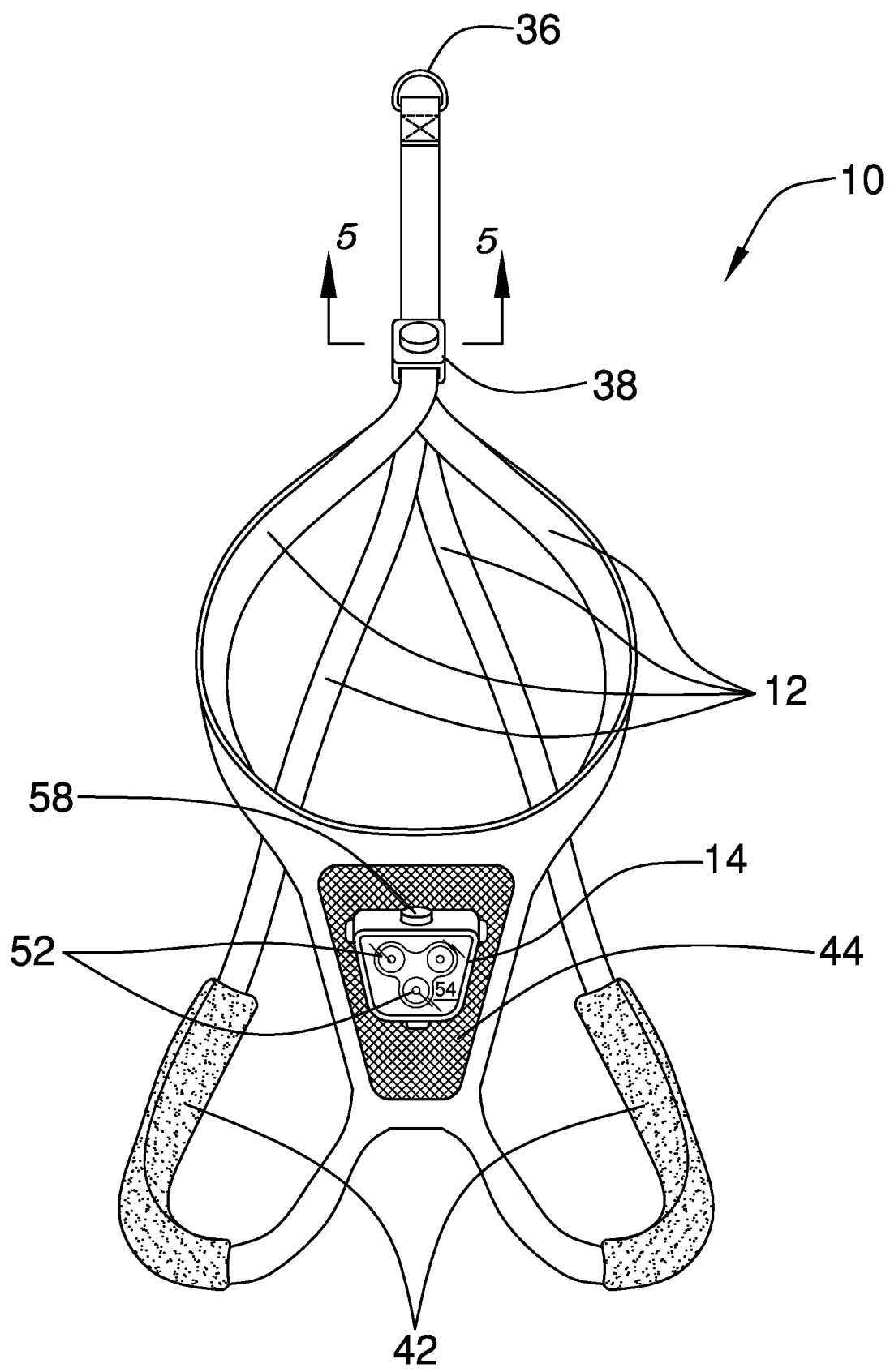
FIG. 1 is a front view of a lighted pet harnessing device according to an embodiment of the disclosure.

With reference now to the drawings, and in particular to FIGS. 1 through 5 thereof, a new harnessing device embodying the principles and concepts of an embodiment of the disclosure and generally designated by the reference numeral 10 will be described.

As best illustrated in FIGS. 1 through 5, the lighted pet harnessing device 10 generally comprises a harness 12 and a lighting module 14. The harness 12 is configured to couple to a pet and a leash. The harness 12 comprises a panel 16, a first strap 18, and a second strap 20. The panel 16 may be isosceles trapezoidally shaped so that an upper end 22 of the panel 16 is dimensionally wider than a lower end 24 of the panel 16. Other shapes of the panel 16, such as, but not limited to, ovally shaped, rectangularly shaped, and the like, also are anticipated by the present invention. The panel 16 comprises a mesh 26 that is configured to allow passage of air through the panel 16.

The first strap 18 is coupled to and extends between upper corners 28 of the panel 16 to define a first loop 30 that is configured to insert a head of the pet. The second strap 20 is coupled to and extends between lower corners 32 of the panel 16. The second strap 20 is coupled to the first strap 18 distal from the panel 16. The first strap 18 and the second strap 20 define a pair of second loops 34, each of which is configured to insert a respective leg of the pet.

A ring 36 is coupled to the first strap 18 and the second strap 20 distal from the panel 16. The ring 36 is configured to couple the harness 12 to the leash. The ring 36 may be substantially D-shaped, or may be alternatively shaped, such as, but not limited to, ovally shaped, circularly shaped, squarely shaped, and the like.

A clamp 38 is slidably coupled to the first strap 18 and the second strap 20 so that the first loop 30 and the second loops 34 are selectively sizable. The clamp 38 is press release type so that pressing a button 40 of the clamp 38 decouples the clamp 38 from the first strap 18 and the second strap 20, thus allowing resizing of the first loop 30 and the second loops 34.

Each of a pair of sleeves 42 is coupled to the second strap 20 proximate to a respective lower corner 32 of the panel 16. The sleeves 42 are configured to pad the second strap 20 so that the harness 12 can be worn comfortably.

The lighting module 14 is coupled to a front 44 of the harness 12 and is configured to illuminate an area in front of the pet when the harness 12 is coupled to the pet. Prior art lighted pet harnessing devices comprise lights that dangle from a collar or harness, thus they fail to direct light to the area in front of the pet. The device 10 of the present invention is configured to illuminate the area, such as a path, that is in front of the pet. The device 10 also would illuminate any animals along the path being traveled by the pet.

The lighting module 14 comprises a housing 46 that defines an interior space 48. A battery 50 is coupled to the housing 46 and positioned in the interior space 48. A set of bulbs 52 is coupled to a forward face 54 of the housing 46. The set of bulbs 52 is operationally coupled to the battery 50 so that the battery 50 is positioned to selectively power the set of bulbs 52 to illuminate the area in front of the pet when the harness 12 is coupled to the pet.

Figure 2:
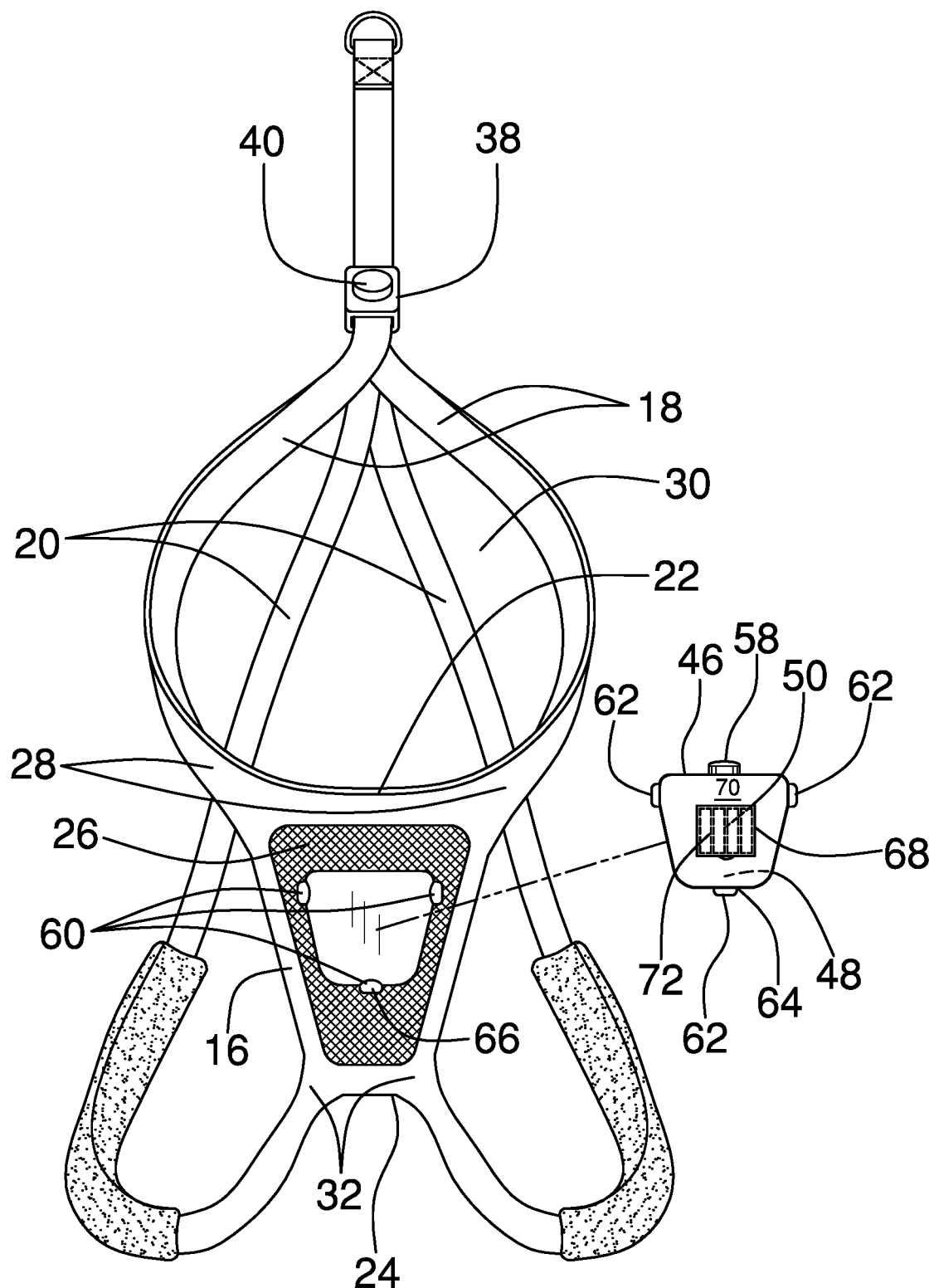
FIG. 2 is a front view of an embodiment of the disclosure.
Figure 3:
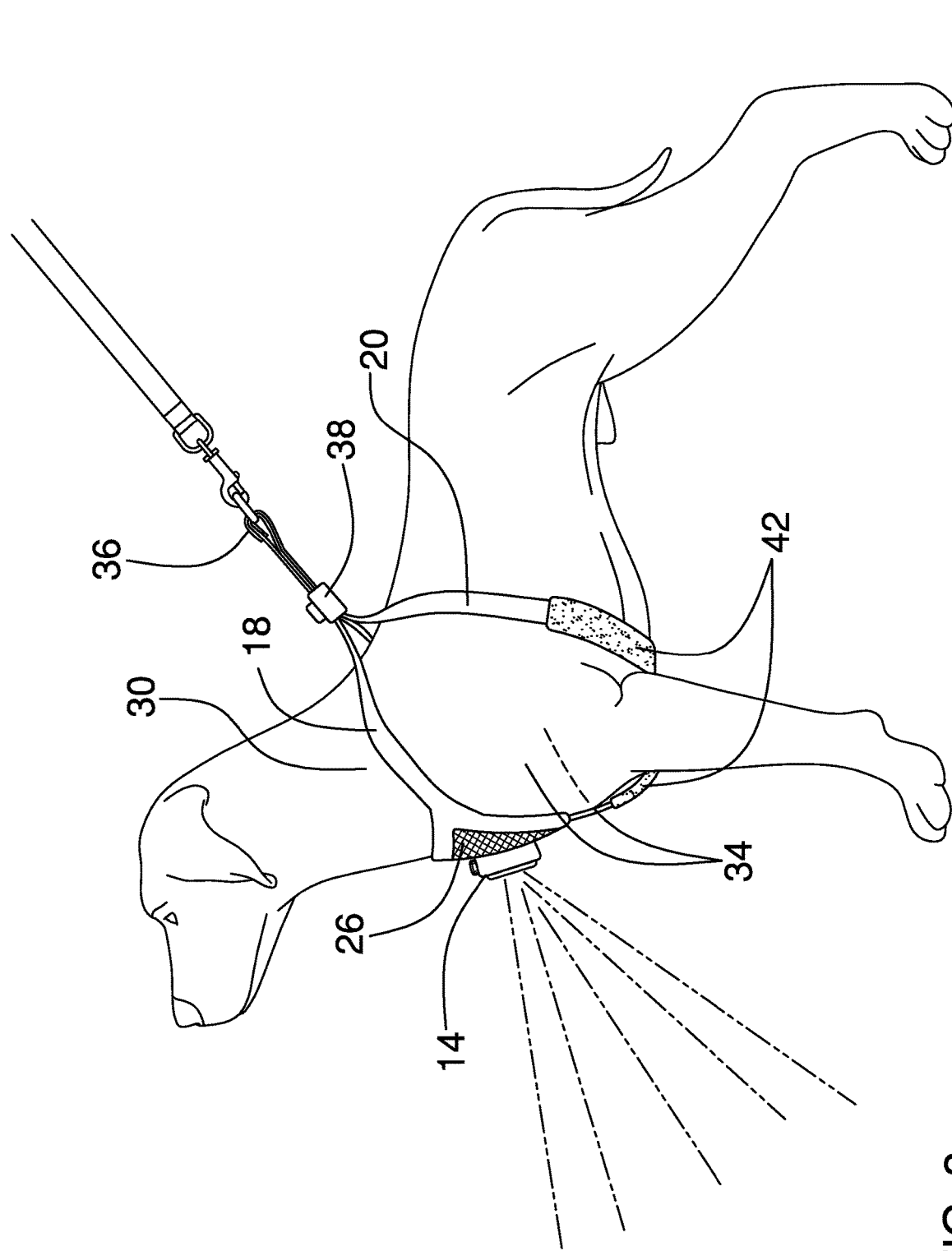
FIG. 3 is an in-use view of an embodiment of the disclosure.
Figure 4:
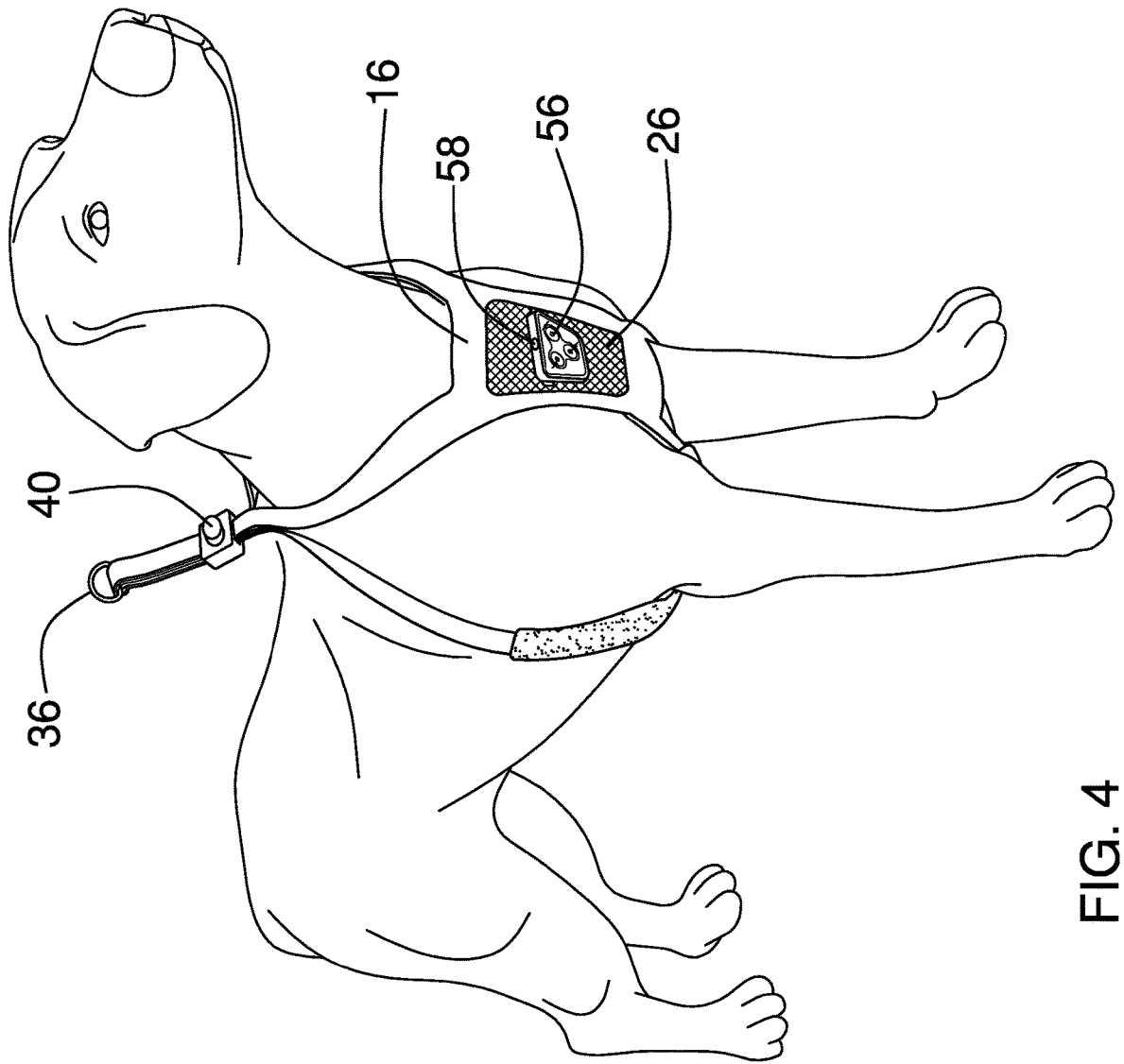
FIG. 4 is an in-use view of an embodiment of the disclosure.
Figure 5:
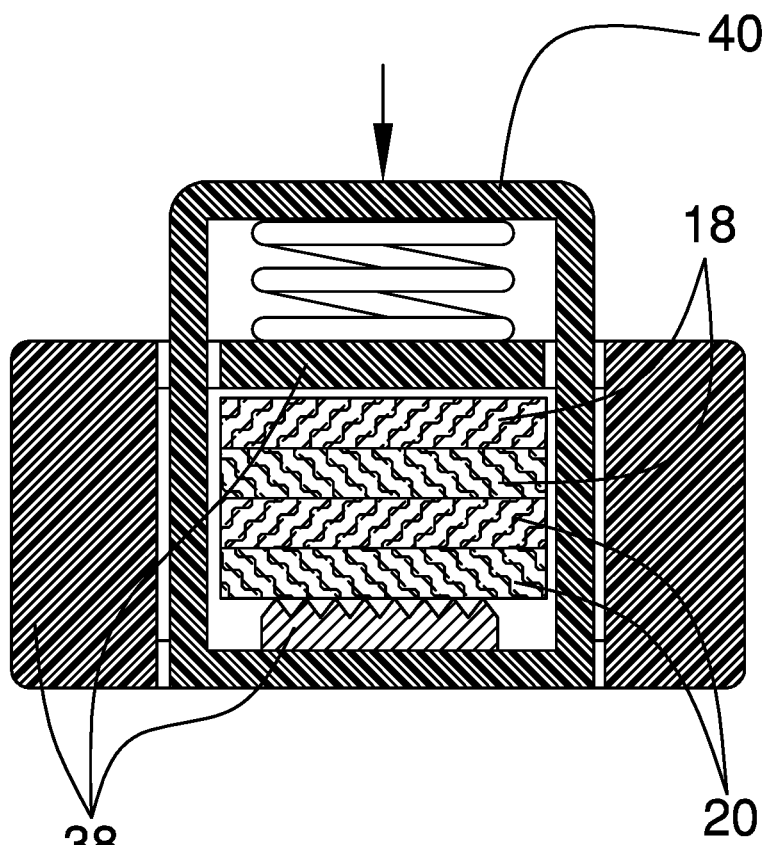
FIG. 5 is a cross-sectional view of an embodiment of the disclosure.

Each bulb 52 comprises a light emitting diode 56. Each bulb 52 emits from 25 to 200 lumens. Each bulb 52 emits from 50 to 150 lumens. Each bulb 52 emits 100 lumens. The set of bulbs 52 may comprise from one to five bulbs 52. For example, the set of bulbs 52 comprises three bulbs 52, as shown in FIG. 2.

A controller 58 that is coupled to the housing 46 is operationally coupled to the battery 50 and the set of bulbs 52 so that the controller 58 is positioned to selectively couple the set of bulbs 52 to the battery 50. The controller 58 may be dial type, as shown in FIG. 2. The controller 58 is configured to be grasped in digits for a hand of a user, positioning the user to selectively rotate the dial to control an intensity of light that is emitted by the set of bulbs 52.

A set of first couplers 60 is coupled to the panel 16. A set of second couplers 62 is coupled to the housing 46. The second couplers 62 are complementary to the first couplers 60 so that each second coupler 62 is positioned to selectively couple to a respective first coupler 60 to removably couple the housing 46 to the panel 16. The second coupler 62 may comprise a tab 64 and the respective first coupler 60 may comprise a slot 66. The slot 66 is positioned to insert the tab 64 to removably couple the housing 46 to the panel 16. The second coupler 62 and the respective first coupler 60 also may comprise other coupling means, such as, but not limited to, hook and look fasteners, snap closures, and the like.

An orifice 68 that is positioned in a rearward face 70 of the housing 46 is configured to allow access the interior space 48 to service the battery 50. A plate 72 is selectively couplable to the housing 46 to close the orifice 68.

In use, the harness 12 is positioned on the pet and the controller 58 is used to select the intensity of light that is emitted by the set of bulbs 52. The light provided by the set of bulbs 52 illuminates the area in front of the pet during walks and when traversing a structure at night.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

We claim:

1. A lighted pet harnessing device comprising:
   a harness configured for coupling to a pet and a leash;
   a lighting module coupled to a front of the harness such that the lighting module is configured for illuminating an area in front of the pet when the harness is coupled to the pet; and
   the harness comprising:
   a panel;
   a first strap coupled to and extending between upper corners of the panel such that the first strap defines a first loop configured for inserting a head of the pet;
   a second strap coupled to and extending between lower corners of the panel, the second strap being coupled to the first strap distal from the panel such that the first strap and the second strap define a pair of second loops each configured for inserting a respective leg of the pet; and
   a ring coupled to the first strap and the second strap distal from the panel wherein the ring is configured for coupling the harness to the leash.

2. The device of claim 1, further including the panel being isosceles trapezoidally shaped such that an upper end of the panel is dimensionally wider than a lower end of the panel.

3. The device of claim 1, further including the ring being substantially D-shaped.

4. The device of claim 1, further including a clamp slidably coupled to the first strap and the second strap such that the first loop and the second loops are selectively sizable.

5. The device of claim 4, further including the clamp being press release type such that pressing a button of the clamp decouples the clamp from the first strap and the second strap allowing resizing of the first loop and the second loops.

6. The device of claim 1, further including a pair of sleeves, each sleeve being coupled to the second strap proximate to a respective lower corner of the panel wherein the sleeve is configured for padding the second strap.

7. The device of claim 1, further including the panel comprising a mesh such that the mesh is configured for passing of air through the panel.

8. The device of claim 1, further including the lighting module comprising:
   a housing defining an interior space;
   a battery coupled to the housing and positioned in the interior space; and
   a set of bulbs coupled to a forward face of the housing, the set of bulbs being operationally coupled to the battery wherein the battery is positioned for selectively powering the set of bulbs for illuminating the area in front of the pet when the harness is coupled to the pet.

9. The device of claim 8, further including each bulb comprising a light emitting diode, each bulb emitting from 25 to 200 lumens.

10. The device of claim 9, further including each bulb emitting from 50 to 150 lumens.

11. The device of claim 10, further including each bulb emitting 100 lumens.

12. The device of claim 8, further including the set of bulbs comprising from one to five bulbs.

13. The device of claim 12, further including the set of bulbs comprising three bulbs.

14. The device of claim 8, further including a controller coupled to the housing, the controller being operationally coupled to the battery and the set of bulbs such that the controller is positioned for selectively coupling the set of bulbs to the battery.

15. The device of claim 14, further including the controller being dial type wherein the controller is configured for grasping in digits for a hand of a user positioning the user for selectively rotating the dial for controlling an intensity of light emitted by the set of bulbs.

16. The device of claim 8, further comprising:
a set of first couplers coupled to the panel; and
a set of second couplers coupled to the housing, the second couplers being complementary to the first couplers such that each second coupler is positioned for selectively coupling to a respective first coupler for removably coupling the housing to the panel.

17. The device of claim 16, further including the second coupler comprising a tab and the respective first coupler comprising a slot such that the slot is positioned for inserting the tab for removably coupling the housing to the panel.

18. The device of claim 16, further comprising:
an orifice positioned in a rearward face of the housing wherein the orifice is configured for accessing the interior space for servicing the battery; and
a plate selectively couplable to the housing for closing the orifice.

19. A lighted pet harnessing device comprising:
a harness configured for coupling to a pet and a leash, the harness comprising:
a panel, the panel being isosceles trapezoidally shaped such that an upper end of the panel is dimensionally wider than a lower end of the panel, the panel comprising a mesh such that the mesh is configured for passing of air through the panel,
a first strap coupled to and extending between upper corners of the panel such that the first strap defines a first loop configured for inserting a head of the pet,
a second strap coupled to and extending between lower corners of the panel, the second strap being coupled to the first strap distal from the panel such that the first strap and the second strap define a pair of second loops each configured for inserting a respective leg of the pet,
a ring coupled to the first strap and the second strap distal from the panel wherein the ring is configured for coupling the harness to the leash, the ring being substantially D-shaped,
a clamp slidably coupled to the first strap and the second strap such that the first loop and the second loops are selectively sizable, the clamp being press release type such that pressing a button of the clamp decouples the clamp from the first strap and the second strap allowing resizing of the first loop and the second loops, and
a pair of sleeves, each sleeve being coupled to the second strap proximate to a respective lower corner of the panel wherein the sleeve is configured for padding the second strap;
a lighting module coupled to a front of the harness such that the lighting module is configured for illuminating an area in front of the pet when the harness is coupled to the pet, the lighting module comprising:
a housing defining an interior space,
a battery coupled to the housing and positioned in the interior space,
a set of bulbs coupled to a forward face of the housing, the set of bulbs being operationally coupled to the battery wherein the battery is positioned for selectively powering the set of bulbs for illuminating the area in front of the pet when the harness is coupled to the pet, each bulb comprising a light emitting diode, each bulb emitting from 25 to 200 lumens, each bulb emitting from 50 to 150 lumens, each bulb emitting 100 lumens, the set of bulbs comprising from one to five bulbs, the set of bulbs comprising three bulbs, and
a controller coupled to the housing, the controller being operationally coupled to the battery and the set of bulbs such that the controller is positioned for selectively coupling the set of bulbs to the battery, the controller being dial type wherein the controller is configured for grasping in digits for a hand of a user positioning the user for selectively rotating the dial for controlling an intensity of light emitted by the set of bulbs;
a set of first couplers coupled to the panel;
a set of second couplers coupled to the housing, the second couplers being complementary to the first couplers such that each second coupler is positioned for selectively coupling to a respective first coupler for removably coupling the housing to the panel, the second coupler comprising a tab and the respective first coupler comprising a slot such that the slot is positioned for inserting the tab for removably coupling the housing to the panel;
an orifice positioned in a rearward face of the housing wherein the orifice is configured for accessing the interior space for servicing the battery; and
a plate selectively couplable to the housing for closing the orifice.

* * * * *